United States Patent [19]

Johnston

[11] Patent Number: 4,507,203

[45] Date of Patent: Mar. 26, 1985

[54] FILTER ELEMENT

[75] Inventor: Gordon L. Johnston, Maple Grove, Minn.

[73] Assignee: Donaldson Company, Inc., Minneapolis, Minn.

[21] Appl. No.: 475,206

[22] Filed: Mar. 14, 1983

[51] Int. Cl.³ .................. B01D 27/08; B01D 46/24
[52] U.S. Cl. .................... 210/445; 210/450; 210/453; 55/501
[58] Field of Search .............. 210/168, 416.4, 416.5, 210/DIG. 17, 450, 451, 452, 444, 445, 453; 55/510, 492, 498, 501

[56] References Cited

U.S. PATENT DOCUMENTS

| | | | |
|---|---|---|---|
| 1,940,316 | 12/1933 | McKinley | 210/DIG. 17 |
| 2,134,385 | 9/1938 | Winslow | 210/168 |
| 3,158,571 | 11/1964 | Supinger | 210/168 |
| 3,423,909 | 1/1969 | Bennett et al. | 55/498 |
| 3,745,753 | 7/1973 | Risse | 55/481 |
| 3,985,657 | 10/1976 | Coughlan | 210/DIG. 17 |
| 4,135,899 | 1/1979 | Gauer | 210/450 |
| 4,261,710 | 4/1981 | Sullivan | 55/502 |
| 4,278,455 | 7/1981 | Nardi | 55/498 |

Primary Examiner—Richard V. Fisher
Assistant Examiner—Wanda L. Millard
Attorney, Agent, or Firm—Merchant, Gould, Smith, Edell, Welter & Schmidt

[57] ABSTRACT

The present invention is directed to a filter element (10) retained between a retention cover (12) and a support (18). Filter element (10) is provided with an inner liner (24) longer than an outer liner (26). Inner liner (24) extends between retention cover (12) and support (18) to absorb substantially all the axial load created by the retention mechanism.

4 Claims, 4 Drawing Figures

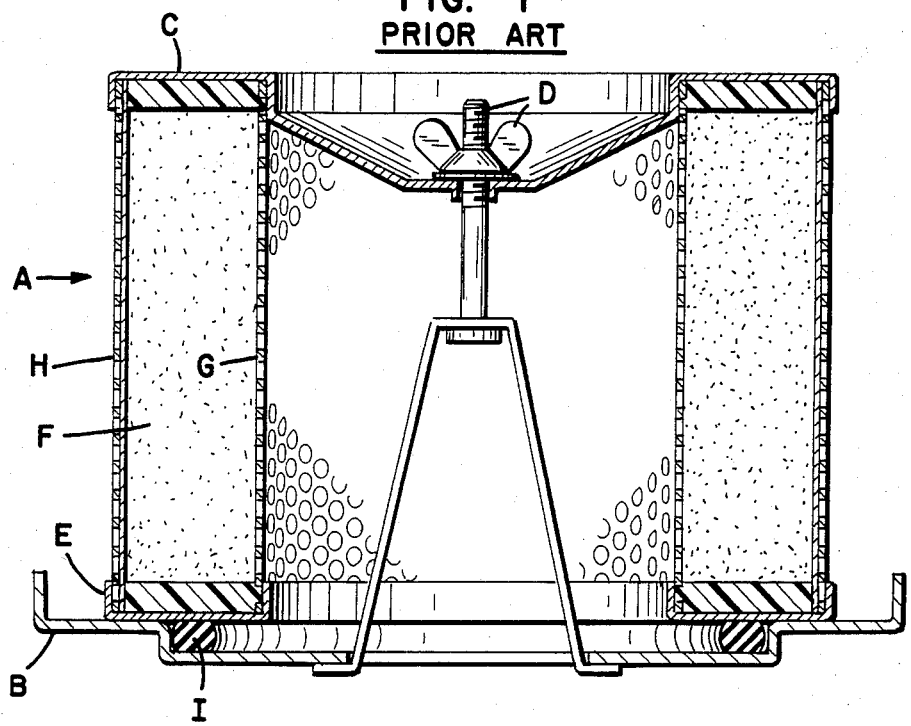
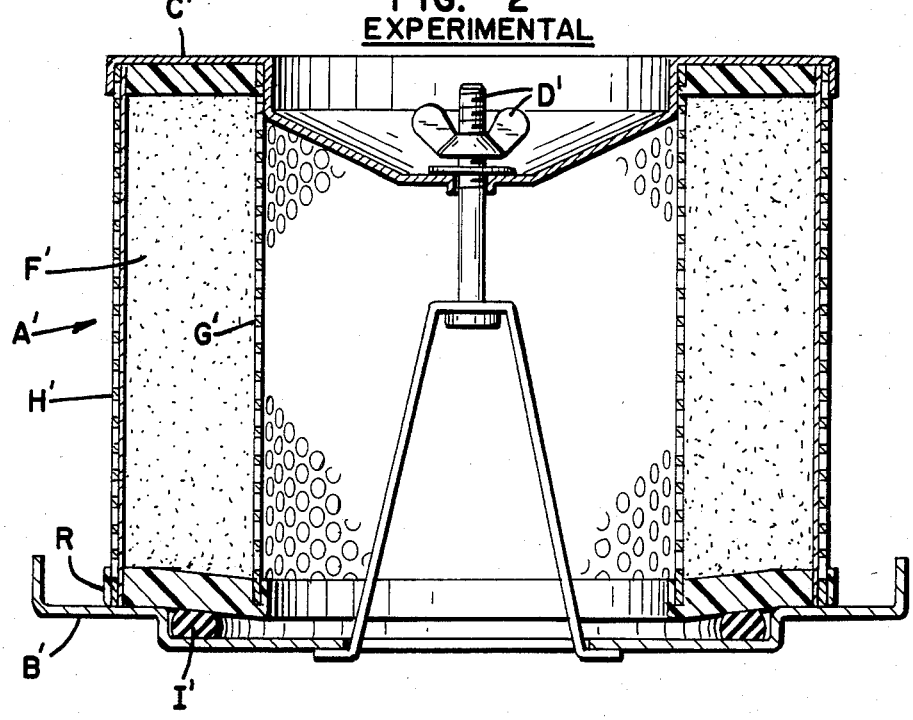

FILTER ELEMENT

TECHNICAL FIELD

This invention relates to the field of gaseous and liquid filters and, more particularly, to filter elements.

BACKGROUND OF THE INVENTION

Filters and, more specifically, filter elements are used in diverse applications. A common usage is to clean air for carburation systems of engines or to clean oil circulating through an engine. An example of a commonly available filter element for use in cleaning air or other gas is shown in FIG. 1 hereinafter. The filter element includes metal endcaps and perforated metal inner and outer liners with a cellulistic filter medium therebetween. Such filters are commonly cylindrical and have a top at the axis of which a stud passes through to retain the filter element with a wing nut to a lower housing. This commonly available filter element, thus, has metal of one form or another completely enclosing the filter medium. These common filter elements are widely used, but are relatively expensive to manufacture due to the amount of assembly labor and parts. The industry has been trying to reduce cost, but has been unable to develop a reliable alternative. The present invention is directed to a new and unique filter which is able to reduce the manufacturing cost.

SUMMARY OF THE INVENTION

The present invention is directed to a filter element for cleaning gaseous or liquid fluids. The filter element is retained by a fastening mechanism between a support and a retention cover. The filter element includes a filter medium and first and second caps at opposite ends of the filter medium. At least one of the caps is non-metallic. A structural element separates the caps and extends substantially between the support and the retention cover.

More particularly, the filter element usually includes inner and outer liners at opposite sides of the filter medium. One of the liners is preferably metallic so as to be a structural member for carrying a substantial portion of any axial load across the filter element as applied between the support or housing and the retention cover by the fastening mechanism. Since the filter element is commonly cylindrical, the structural liner is preferably the inner liner, but it could be the outer liner. Such structural member also functions advantageously to control the compression of the gasket between one of the covers and the support or housing. In this fashion, the gasket is constantly compressed uniformly and is much less likely to take on a compression set.

The present invention advantageously then provides structure to absorb axial load across the filter element. Such structure is accomplished without the necessity for a complete metallic enclosure about the filter medium. Fewer parts are used in manufacture as compared to the art. Assembly labor may be reduced. An inexpensive filter element results. Furthermore fewer metal parts results in reduced likelihood of rusting and, consequently, a more durable product.

These advantages, and other objects obtained with this invention, are further explained hereinafter by reference to the following drawings and a detailed descriptive relative thereto.

BRIEF DESCRIPTION OF THE DRAWINGS

FIG. 1 is a cross-sectional view of a prior art filter element;

FIG. 2 is a cross-sectional view of an experimental filter element design;

DETAILED DESCRIPTION OF THE PREFERRED EMBODIMENT

Figure 3:
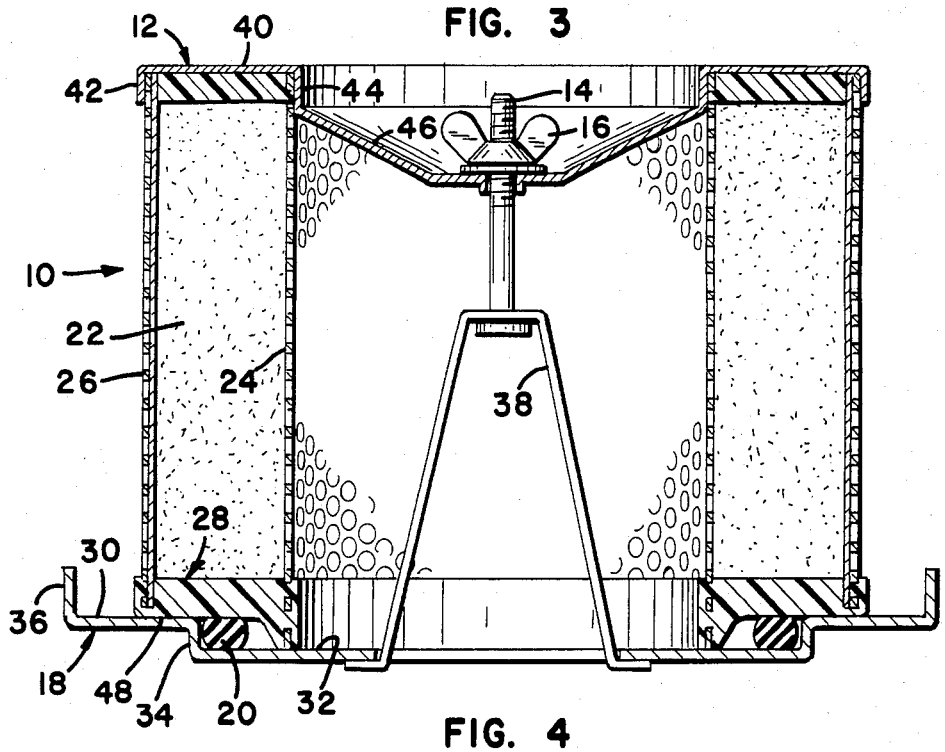
FIG. 3 is a cross-sectional view of a filter element in accordance with the present invention.

Referring now to the drawings, it is appropriate to first describe a prior art device as well as an experimental design in order to more clearly understand the significance of the present invention. As shown in FIG. 1, a filter element A is held between a housing B and a retention cover C by a bolt and wing nut combination D. Retention cover C is a fixed attachment to filter element A. At the end opposite retention cover C is a ring-shaped cover E. On either side of filter medium F are inner and outer liners G and H. The various elements surrounding filter medium F, that is, covers C and E and liners H and G are commonly metallic. The metallic enclosure is readily clamped by fastening mechanism D to housing B to compress gasket I between support B and ring cover E.

In developing the present invention, the experimental design of FIG. 2 was considered and rejected. Corresponding parts between FIGS. 1 and 2 are identified similarly, except primes are used in FIG. 2 so as to distinguish between the different designs of FIGS. 1 and 2.

The filter element A' is similar to the element A of the prior art except end cap E is eliminated and replaced by a urethane or other elastomeric cap R. Filter element A' is fastened to housing B' with fastening mechanism D' in a similar fashion as described above. It was found, however, that after a period of time the outer liner H' sheared through end cap R. Also, although the inner liner G' did not shear into cap R, cap R experienced creep and, therefore, bent downwardly as shown in FIG. 2 further compressing gasket I'. As these things happened, the tension between the bolt head and the wing nut of fastening mechanism D' lessened so that it was possible for vibration to completely loosen the wing nut, thereby completely loosening filter element A' from housing B'. Thus, until the present invention, it appeared that it was not possible to replace metallic end cap E with an elastomeric end cap R.

Figure 4:
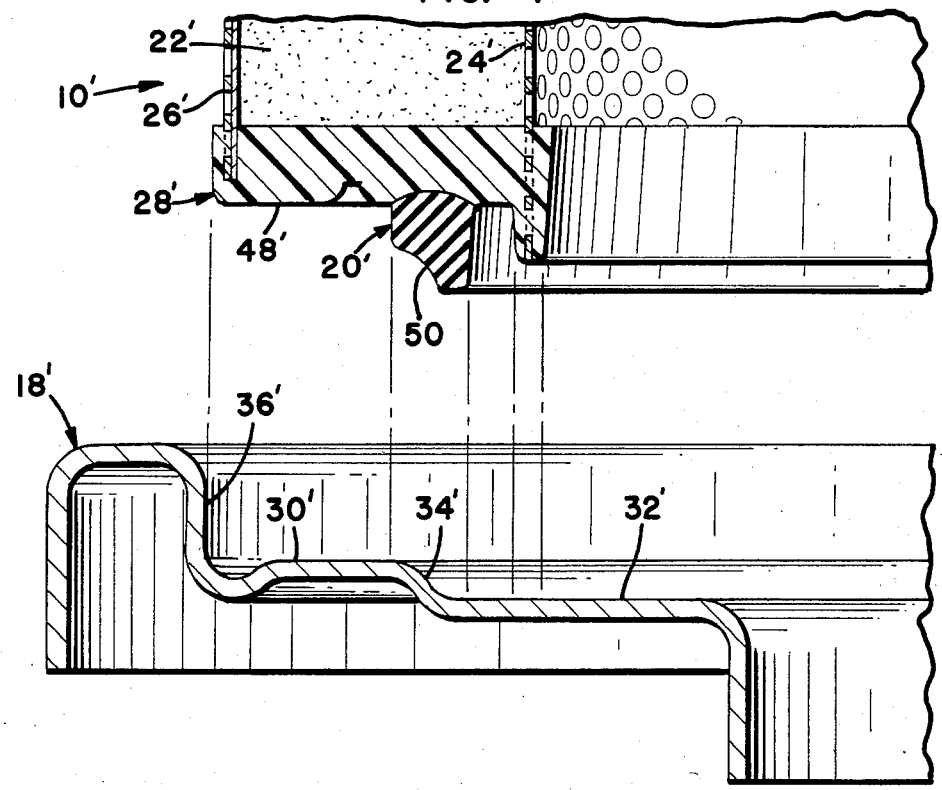
FIG. 4 is a partially exploded, cross-sectional view of a detailed portion of an alternate embodiment.

The present invention is shown in FIGS. 3-4. Filter element 10 includes retention cover 12 at one end. A bolt 14 and wing nut 16 fasten filter element 10 by way of tightening retention cover 12 to support or housing 18. Filter element 10 includes at least one elastomeric end cap 28 and a structural or inner liner 24 which prevents shearing or creep of cap 28 due to loading on element 10 by the filter fastening mechanism.

Filter element 10 includes a filter medium 22 sandwiched between an inner liner 24 and an outer liner 26. An end cap 28 opposite retention cover 12 extends between inner liner 24 and outer liner 26. End cap 28 is non-metallic and commonly an elastomeric material. As filter element 10 is pressed against support 18, gasket 20 compresses and seals the space inside cylindrical element 10 from that outside.

Housing 18, as shown in the embodiment of FIG. 3, has a bi-level support platform for filter element 10. Outer level 30 is substantially parallel with inner level 32, but is spaced therefrom a distance equal to the preferable height of compressed gasket 20. A wall 34 orthogonal to surfaces 30 and 32, extends between and separates surfaces 30 and 32. An outer retaining wall 36 rises from the outer perimeter of higher surface 30. At the center of housing 18, a cone-shaped structure 38 is welded or otherwise fastened. The top of cone structure 38 is flattened and includes an opening through which bolt 14 may pass.

Retention cover 12 includes a ring plate 40 which extends between the outer surfaces of inner and outer liners 24 and 26. At the outer perimeter of plate 40 is a downwardly extending wall 42. Another downwardly extending wall 44 is located at the inner perimeter of the ring formed by plate 40. A further recessed wall 46 extends inwardly and includes an opening for receiving bolt 14 so that in combination with wing nut 16, the fastening mechanism may tighten retention cover 12, and, therefore, filter element 10 to housing or support 18.

Filter medium 22 is commonly made from a cellulistic material and, by itself, is generally incapable of transferring an axial load.

Outer liner 26 may be metal, an elastomer, or other material which is capable of providing a perforated protective cover for filter medium 22. Outer liner 26 ordinarily provides very little structural support against the axial load on filter element 10 applied by bolt 14 and wing nut 16. Inner liner 24, on the other hand, is a structural element which carries a substantial portion of the axial load on filter element 10. Inner liner 24 is preferably metallic, although it may be made of another structurally sufficient material. Inner liner 24 extends between plate 40 of retention cover 12 and lower surface 32 of bottom support or housing 18. It is, of course, understood that outer liner 26 may be the structural liner while inner liner 28 is not. It is also understood that only one liner may be present with it then being structural.

End cap 28 is preferably an elastomeric material and has a substantially flat outer surface 48 which is parallel to upper surface 30 of housing 18 when element 10 is retained to housing 18. Surface 48 extends inwardly from outer liner 26 to near inner liner 24 before it drops downwardly to the end of inner liner 24 which contacts surface 32 of housing 18. Gasket 20 is molded to cap 28 or fastened with some other known mechanism to surface 48. Thus, when filter element 10 is retained against housing 18, gasket 20 is compressed between surface 48 and surface 32 to form a seal. As indicated, the separation of the two levels of housing or support 18 controls the compression of gasket 20 thereby reducing gasket compression set. As a consequence, inner liner 24 must be longer than outer liner 26.

In the embodiment of FIG. 3, retention cover 12 forms one end cap for filter medium 22. It is understood that an elastomeric end cap could be used and that retention cover 12 would then simply press against filter element 10 to retain it to support 18.

FIG. 4 shows a somewhat different configuration for support 18' and gasket 20'. That is, wall 34' of support 18' is inclined and arcuately matched with bi-level surfaces 30' and 32'. Gasket 20' has a lower surface 50 which generally conforms to the shape of wall 34' and short portions of surfaces 30' and 32'. As filter element 10' is pressed against support 18', inner liner 24' contacts surface 32'. Gasket 20' is appropriately compressed. End cap 28' does not otherwise contact support 18' except possibly at outer wall 36'. In this case, the mechanism for controlling the compression of gasket 20' is the level separation between the end of inner liner 24' and the outer surface 48' of end cap 28'.

In use, a filter element 10 is simply placed in or on an appropriate housing 18 and retained with a fastening mechanism such as bolt 14 and wing nut 16. The fastening mechanism is tightened until inner liner 24 makes structural contact with both retention cover 12 and surface 32 of housing 18. In this fashion, gasket 20 is compressed to form a seal.

Thus, the present invention in the form of the embodiments described advantageously allows elimination of certain parts while providing an element to absorb the axial load inherently present when a filter element 10 is implaced and retained as necessary. In spite of these characteristics and advantages, together with detail of structure and function, however, it is to be understood that this detailed description is illustrative only. Consequently, changes made, especially in matters of shape, size and arrangement, to the full extent extended by the general meaning of the terms in which the appended claims are expressed, are within the principle of this invention.

What is claimed is:

1. A filter element for cleaning fluids, said filter element being compressed by an axial load with fastening means holding said filter element to a top surface of a support, said filter element comprising:
   a non-structural cylindrical filter medium having inner and outer sides;
   first and second caps at opposite ends of said filter medium, said first cap including a metallic retainer, said metallic retainer having a bottom surface;
   a structural member on a first side of said filter extending from the bottom surface of the metallic retainer to the top surface of said support, wherein said member carries a substantial portion of the axial load on said filter element.

2. A filter element in accordance with claim 1 including a liner for said medium, said liner being on a second side of said filter and being shorter in length than said structural member.

3. A filter element for cleaning fluids, said filter element being retained by fastening means to a support, said support having a top surface, said filter element comprising:
   a filter medium;
   first and second non-metallic caps at opposite ends of said filter medium;
   means for connecting said first cap to said fastening means, said connecting means having a bottom surface and;
   first and second liners at opposite sides of said filter medium, at least one of said liners being structurally rigid and extending between the top surface of said support and the bottom surface of said connecting means.

4. A filter element for cleaning fluids, said filter element being retained by fastening means to a support, said support having a top surface, said filter element comprising:
   a filter medium;
   first and second caps at opposite ends of said filter medium;

a retention cover attached to said first cap, said cover having a bottom surface;
a gasket attached to said second cap, said gasket being compressed by said fastening means against said support to form a seal; and
means for controlling compression of said gasket thereby reducing gasket compression set, said compression controlling means including an incompressible member extending between the bottom surface of said retention cover and the top surface of said support.

* * * * *